United States Patent [19]

Sugiura et al.

[11] 4,074,115
[45] Feb. 14, 1978

[54] METHOD AND APPARATUS TO READ-IN BAR-CODED INFORMATION

[75] Inventors: Akio Sugiura, Nagoya; Tadao Nojiri, Kariya, both of Japan

[73] Assignee: Nippondenso Co., Ltd., Kariya, Japan

[21] Appl. No.: 742,121

[22] Filed: Nov. 15, 1976

[30] Foreign Application Priority Data

Nov. 19, 1975  Japan ............................. 50-139424
Sept. 14, 1976  Japan ............................. 51-110209

[51] Int. Cl.$^2$ ..................... G06K 7/10; G08C 9/06
[52] U.S. Cl. ................................. 235/462; 250/555
[58] Field of Search ............ 235/61.11 E, 61.11 D; 250/555, 566, 568; 360/2

[56] References Cited

U.S. PATENT DOCUMENTS

| | | | |
|---|---|---|---|
| 3,876,981 | 4/1975 | Welch | 235/61.11 E |
| 3,932,840 | 1/1976 | Hanchett | 235/61.11 E |
| 3,971,917 | 7/1976 | Maddox et al. | 235/61.11 E |

Primary Examiner—Daryl W. Cook
Attorney, Agent, or Firm—Cushman, Darby & Cushman

[57] ABSTRACT

A card on which at least a group of bar-coded information are printed is carried by a motor-driven carrier. The bar-coded information is sensed and converted into a group of parallel digital signals, which is compared with a previously stored data to check coincidence. The same bar-coded information is repeatedly sensed, converted, and compared as above and number of the coincidence times is counted until it has passed a read-in position driven by the card carrier. The card is accepted as readable when the number of coincidence times reaches a preset number. Otherwise, it is rejected by reversing the motor.

11 Claims, 7 Drawing Figures

METHOD AND APPARATUS TO READ-IN BAR-CODED INFORMATION

CROSS REFERENCE TO A RELATED APPLICATION

The present invention is related to a U.S. Pat. application, Ser. No. 668,036 entitled "Method and Apparatus to Read in Bar-Coded Information" filed on Mar. 18, 1976 in the name of Tadao Nojiri et al assigned to the assignee of the present invention.

BACKGROUND OF THE INVENTION

The present invention relates to a method and apparatus to automatically and electronically read in bar-codes, each of which is recorded with a plural numbers of bar symbols of different width on a surface of an object such as a card. In particular, this invention relates to a method and apparatus to automatically discriminate readable and unreadable bar-coded informations through a plurality of read-in steps of the bar-coded information.

SUMMARY OF THE INVENTION

It is a primary object of the present invention to provide a method and apparatus to readily discriminate readable and unreadable bar-coded information on a surface of a card.

It is a further object of the present invention to provide a method and apparatus to reject a card with an unreadable bar-coded information or a misread card.

DESCRIPTION OF THE PREFERRED EMBODIMENT

Figure 1:
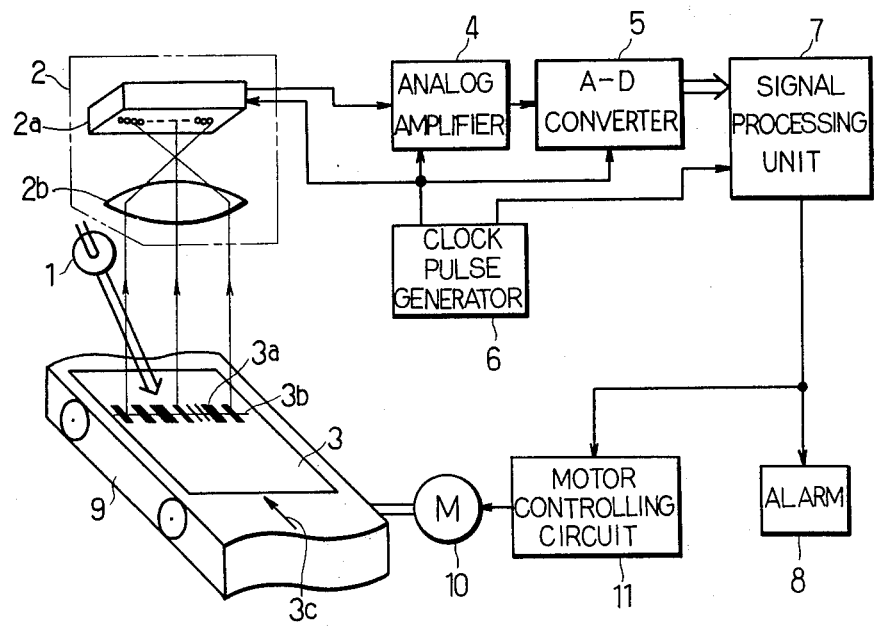
FIG. 1 is a schematic diagram illustrating an embodiment according to the present invention.

Referring to FIG. 1, one embodiment of the apparatus according to the present invention comprises a light source 1 such as a tungsten lamp, a sensing section 2 including an image sensor 2a and a lens 2b, a card 3, on which numbers of bar codes 3a are printed, an analog amplifier 4, a A-D converter 5, a clock pulse generator 6, a signal processing unit 7, an alarm 8 a card carrier 9, a motor 10 and a motor control circuit 11. The detailed description of the light source 1, the sensing section 2, the card 3, the analog amplifier 4, the A-D converter, and a clock pulse generator 6 is given in the cross-referenced co-pending application Ser. No. 668,036, and, therefore, omitted.

The signal processing unit 7 reads in the digital signal from the A-D converter 5, and makes processing such as comparison and discrimination to discriminate an unreadable bar-coded information which will be described in more detail later. The alarm 8 is arranged to provide a signal when the unit 7 discriminates an unreadable bar-coded information. The card carrier 9 is driven by the motor 10 to carry the card 3 to read in the bar-coded information on the surface thereof. The motor controlling circuit 11 reverses the motor to reject the card 3 in response to a signal generated when the signal processing unit 7 discriminates an unreadable bar-coded information. The construction and operation of the motor controlling circuit 11 and the motor are well known in the art and detailed description therefor is omitted.

Figure 2:
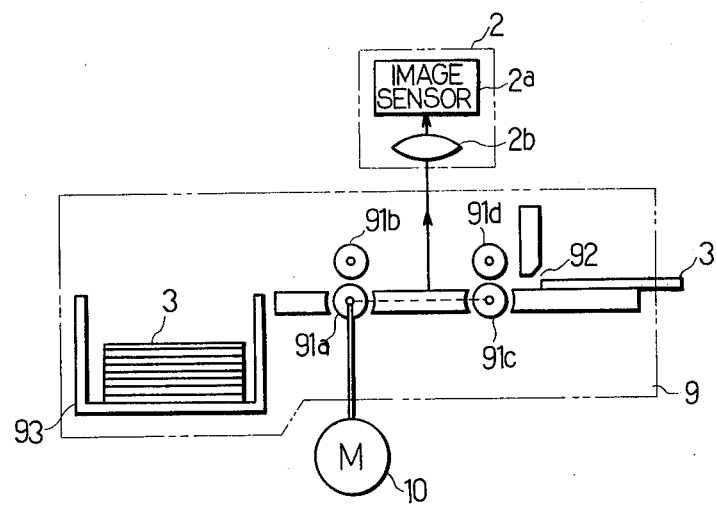
FIG. 2 is a schematic sectional illustration of one embodiment of the card carrier shown in FIG. 1.

FIG. 2 shows to explain the construction of one embodiment of the card carrier 9, which comprises a couple of rollers 91a and 91b, another couple of rollers 91c and 91d, a loading slit 92, and a card reservoir 93. Those rollers 91a, 91b, 91c and 91d are driven by the motor 10.

When a card 3 is inserted into the loading slit 92, it is caught between the couple of rollers 91c and 91d and carried forward at a constant speed to the other couple of rollers 91a and 91b. On the way, the bar-coded information printed on the surface of the card 3 is sensed and converted into a train of electrical signals by the sensing section 2 in the manner described in the copending application mentioned above.

Then the electrical signals are processed to distinguish the bar-coded information between readable or unreadable one.

When the bar-coded information is readable, the card 3 is further carried by the couple of rollers 91a and 91b to the left to be sent into the reservoir 93. On the other hand, when the card 3 is printed with unreadable information, the motor controlling circuit 11 makes the motor 10 reverse, thereby to send the card 3 back to the inserting slit 92.

Next will be explained the general operation of the apparatus according to the present invention.

When the card 3 is loaded on the card carrier 9, it is carried in the way described above so that the bar-coded information is sensed by the sensing section 2.

As a result, a train of electrical signals in an analog form are generated, which are, in turn, amplified, reshaped and A/D-converted to on-off signals in the analog amplifier 4. For instance, white bar is converted to 1 level and black bar is converted to 0 level. The on-off signals are processed in the A-D converter 5 in which broad bar symbols and narrow ones are discriminated to form a group of binary parallel digital signals, which are in turn read in by the signal processing unit 7 to be subjected to signal processing. In this signal processing according to the present invention, a group of read-in information is compared with a group of previous read-in information to discriminate coincidence between those two informations. While the card 3 is being carried over the card carrier such steps as form sensing the bar-coded information to comparing the two groups of information are repeated.

When the two groups of informations coincide, one is counted to be accumulated. When all the bar-coded information have been sensed and processed as above while the card is still on the card carrier, the number of the coincidence times is compared with a predetermined threshold level. If the coincidence time is larger than the threshold level, the card 3 is continuously carried forward to the reservoir 93. On the other hand, if the number of the coincidence time is not larger than the threshold level, the signal processing unit 7 generates a signal and, in response thereto, the motor controlling circuit 11 makes the motor 10 reverse to send the card 3 back to the loading slit 92, with giving an alarm.

Figure 3:
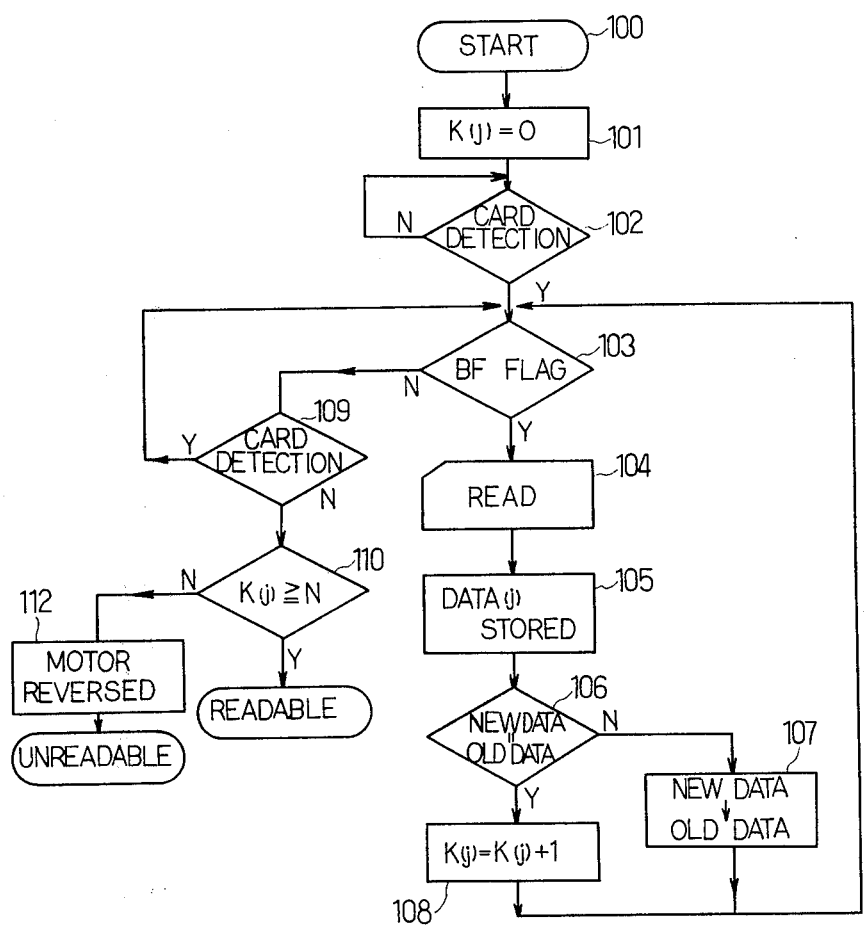
FIG. 3 is a flow chart for the signal processing sequence of one embodiment according to the present invention.

To this end, one embodiment of the signal processing unit 7 operates as shown by the flow chart in FIG. 3. In this embodiment, the unit 7 determines the bar-coded information readable if the number of coincidence time is equal to or larger than a preset value N. A variable "j" indicates a group number.

After a step of start 100 with K(j) being set "0", a card detection step 102 is repeated until the bar-coded information printed on the surface of the card 3 is read in by the sensing section. When the bar-coded information has been read (YES), BF flag which indicates a completion of D/A convertion is checked in a step 103. When the BF flag is set to be YES, the information data is read in in a step 104, followed by a step 105 in which the data is stored in DATA (j). In the next step 106, the newly read-in data is compared with a previously read-in data.

If the both datas do not coincide (NO), the new data is substituted for the old one in the step 107 and, subsequently, the steps starting from the step 103 are repeated. On the other hand, if both datas are found to be the same in the step 106 (YES), "1" is added to K(j) in the next step 108, thereby to count number of the coincidence times, returning to the step 103. Thus, every time one series of the steps are repeated and newly read-in data coincides with the old data "1" is added to increase K(j) one by one.

When all the bar-coded informations of one card have been read in, and non-existence of the bar-coded information is found in a card detection step 109, final K(j) is compared with a preset value N.

When K(j) is smaller than N, the card is discriminated as unreadable in the next step 110 and a motor reversing signal is generated in the next step 112.

On the other hand, if K(j)≧N is applied, the card is determined to be readable.

Figure 4:
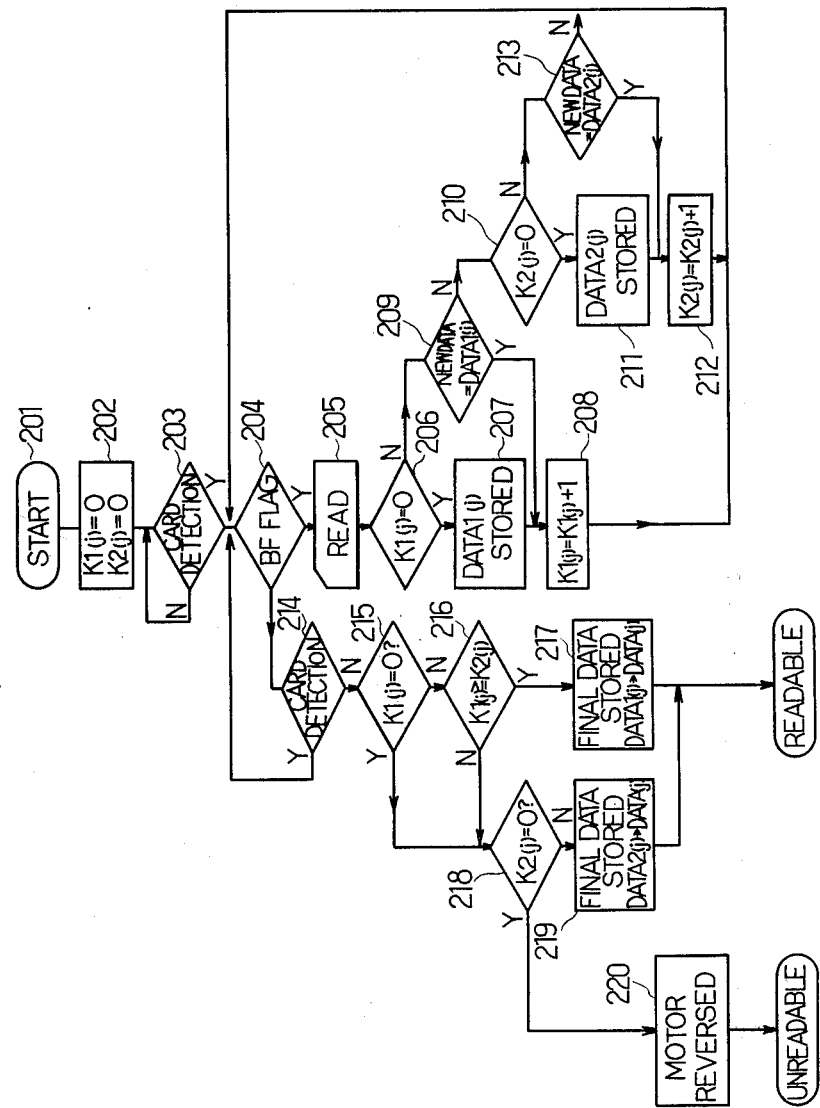
FIGS. 4, 5 and 6 show, respectively, other flow charts for the signal processing sequences of second, third and fourth embodiment according to the present invention.

FIG. 4 shows a flow chart for the operation of the second embodiment of the signal processing unit 7.

In this embodiment, if read-in information are different in a plurality of read-in steps, those information datas are classified into two groups with regard to similarity of the bar-coded information and compared with another in each group to determined such information of one group to be readable as coincide more times than the other. In this embodiment, if the no coincidence exists in the both groups, the card is determined to be unreadable.

In a step 202 after step 201 of start, K1(j), and K2(j) are respectively set to be "0", with a card detection step 203 being repeated until the bar-coded information of the card comes to the place to be read in. When the card is detected (YES), the BF flag is checked to proceed to a read step 205 if the BF flag is set (YES). If the K1(j) is found to be "0" (YES) in a step 206, in the next step 207 is stored in DATA 1(j) the data, followed by the step 208 where K1(j) is added by "1" to return to the step 204. In the step 204 the BF flag is checked again and the step 209 follows if K1(j) is determined not to be "0" in the step 206. In the step 209, the newly read-in data is compared with the previously read-in data to proceed to the next step 208 where "1" is added to K1(j) to become "2" if the both datas coincide. Subsequently, the step 204 follows. If the newly read-in data does not coincide with the old one in the step 209 (NO), a step 210 follows to determined if K2(j) is "0" or not. And if the answer is YES, the data is stored into DATA 2(j) in the next step 211, followed by a step 212 where "1" is added to K2(j), with subsequent return to the step 204. After having been processed through the same steps and when the data comes to the step 210 the determination that K2(j) is not "0" is made, and it goes to the subsequent step 213 where the coincidence between new and old datas is determined when those datas coincide (YES), a step 212 where "1" is added to K2(j) to become "2", and then, the step 204 follow successively.

A series of signal processing steps from the step 204 through the step 213 are repeated every time parallel digital signals are generated from the A-D converter 5. When one group of bar-coded information as is indicated by numeral 3a in FIG. 1 has passed the read-in position designated by numeral 3b in the same drawing, the BF flag is not set (NO), followed by a step 214 to detect presence of the card 3. When the card is not detected, a step 215 follows to determine whether K1(j) is "0" or not to have the next step 216 if K1(j) is not "0". In the step 216, K1(J)≧K2(j) is checked and, if this equation is applied (YES), the data stored in DATA 1(j) is stored in DATA (j) in the subsequent step 217. On the other hand, when the equation is not applied (NO) in the step 216, step 218 follows to determine whether K2(j) is 0 or not, and, if the result is NO, the data stored in DATA 2(j) is stored in DATA(j). If the above result is YES, the data is determined as unreadable with the result that the card 3 is rejected out of the slit 92 as aforementioned in a step 220.

Figure 5:
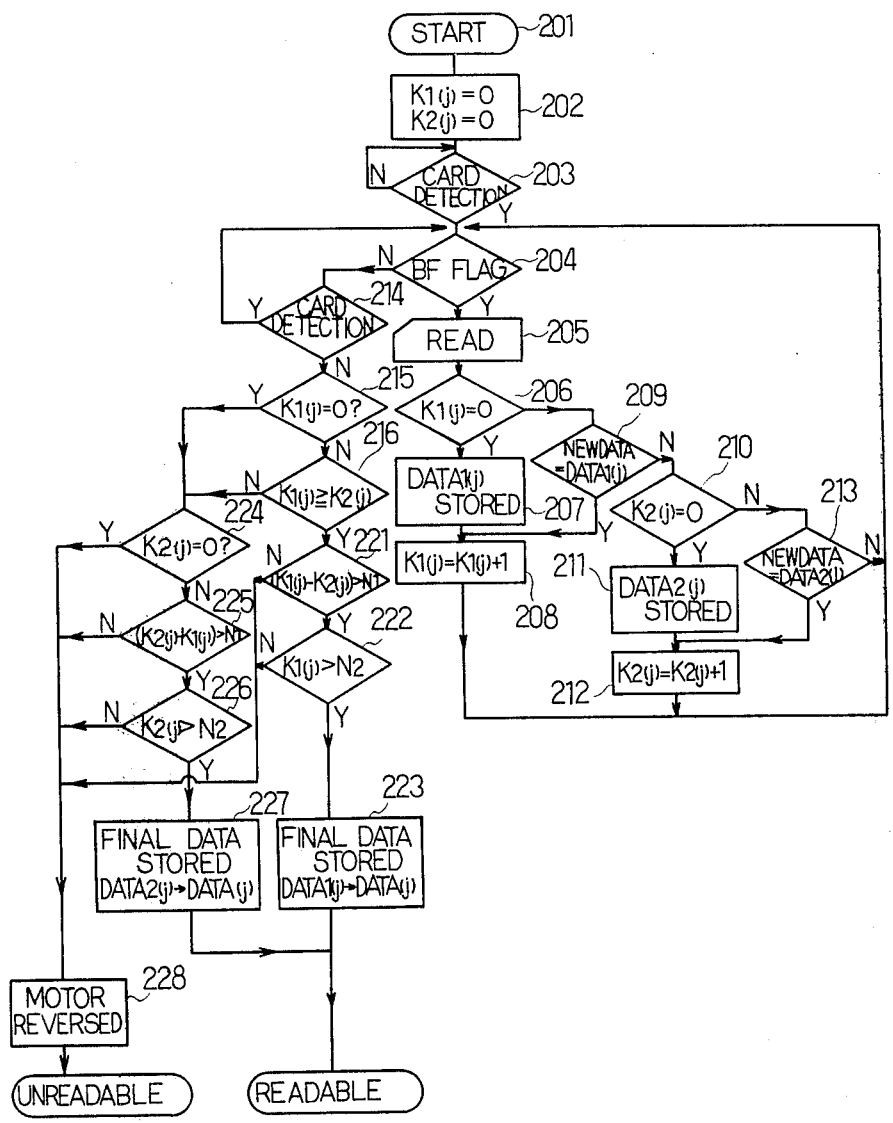

FIG. 5 is flow chart for the operation of the third embodiment of the signal processing unit according to the present invention. In this embodiment, the difference in number of coincidence times in two data groups is compared with a predetermined number N1 and a larger number of coincidence times is compared with another predetermined number N2. When the difference is not larger than N1 or when the larger number of coincidence times is not larger than N2, the information is determined to be unreadable.

Next will be explained the operation except that operation which is substantially the same as the second embodiment shown in FIG. 4 is omitted.

When a group of bar-coded information has been read in and has passed the read-in line, a card detection step 214 is followed by the next step 215 where whether K1(j) is 0 or not is checked. When the answer is NO, K1(j)≧K2(j) is checked in the next step 216, followed by the next step 221 where K1(j) − K2(j)>N1 is check with the answer in the step 216 is YES. Further, if the result in the step 221 is YES, K1(j)>N2 is checked in the following step 222 with the subsequent final step 223 in case the answer in the step 222 is YES. In the final step 223, the data stored in DATA 1(j) is stored as a correct data into DATA (j). On the other hand, when K1(j) = 0 is YES or K1(j)≧K2(j) is NO, a step 224 follows to check whether K2(j)=0 is YES or NO. When the answer is NO, K2(j) − K1(j) >N1 is checked in the next step 225 and K2(j)>N2 is checked in the step 226 if the answer of the step 225 is YES. When the answer of the step 226 is YES, the data stored in DATA 2(j) is stored into DATA (j) to complete the read-in operation.

On the other hand, when the answer is respectively YES, NO, NO or NO in the respective steps 224, 225, 226 or 221, step 228 follows to control the motor 10 to reverse, thereby to reject the card 3 from further reading.

Figure 6:
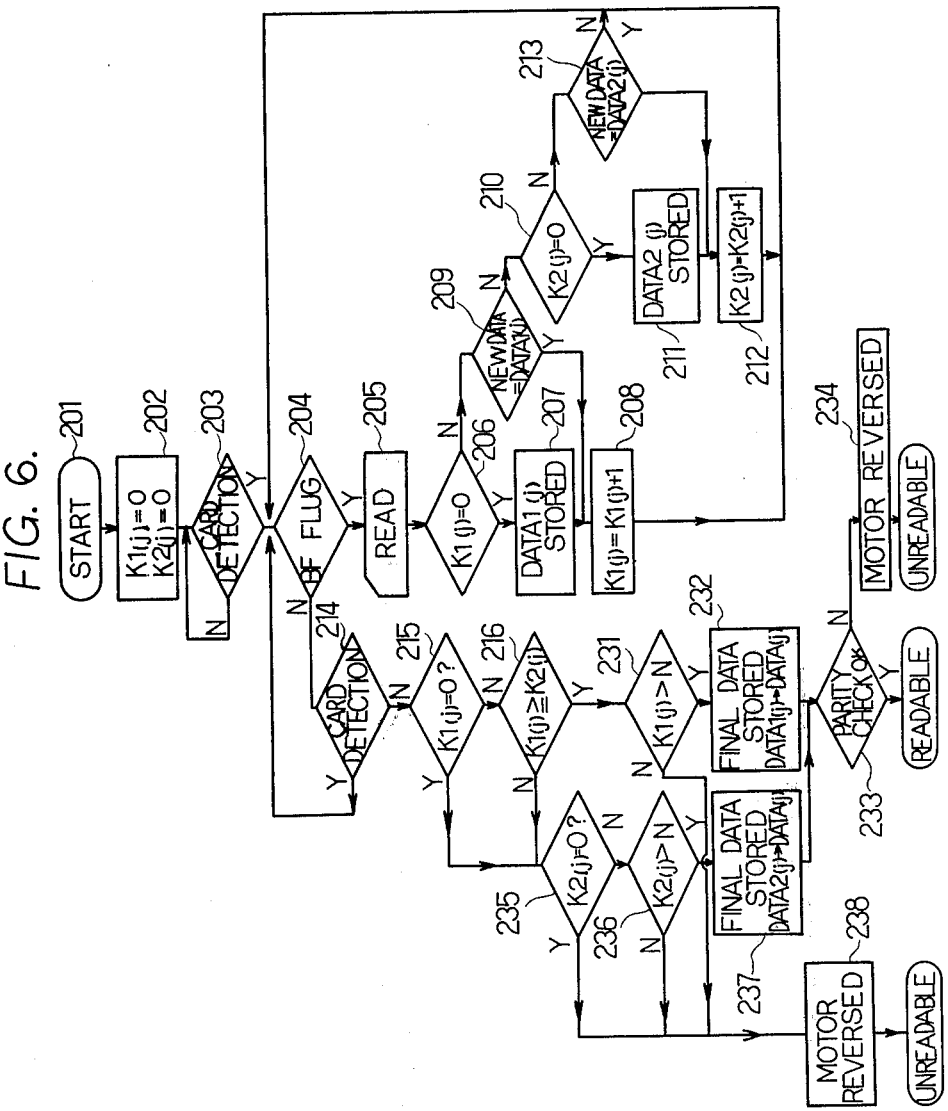

FIG. 6 explains the operation of a fourth embodiment of the signal processing unit 7, in which when larger number of coincidence times in the two grouped datas is not larger than a predetermined number, the data is determined as unreadable.

The discussion will be made on the operation which is different from that of the second embodiment.

When one group of bar-coded informations printed on the card 3 have been read-in and passed through the read-in line 3b shown in FIG. 1, a card detection step 214 is followed by the step 215 where K1 (j) = 0 is checked. When the answer is NO, K1(j)≧K2(j) is checked in a step 216 and K1(j)>N is checked in the subsequent step 231 when that answer is YES. When the result of the step 231 is YES, the data stored in DATA 1(j) which corresponds to K1(j) is restored into DATA (j) as correct data, with the subsequent step 233 where parity checking or SUM checking is made. If the answer is YES the all reading steps are made over. If, on the other hand, the parity checking results in NO, the motor is made reversed to reject the card 3.

When in the step 215 the answer is YES, or when in the step 216 the answer is NO, a step 235 follows to check K2(j) = 0. If the answer is NO, the next step 236 follows to check K2(j)>N and the data stored in DATA 2(j) which corresponds to K2(j) is stored into DATA (j) in the subsequent step 237 with the answer of the step 236 being YES. Thereafter, the step 233 follows to make parity checking to stop all the process if the result is YES. If the result is NO, on the contrary, the card 3 is rejected as the motor 10 reverses in the step 234.

Further, if the answer of the step 235 is given as YES or if the answer of the step 231 is NO, a step 238 follows to reverse the motor 10.

Figure 7:
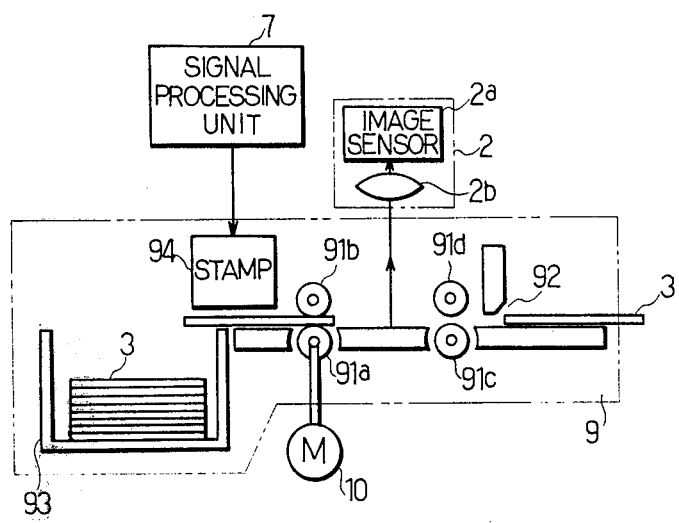
FIG. 7 is a schematic sectional illustration of a modified embodiment of the card carrier shown in FIG. 1.

A modified embodiment of the card carrier 9 will be explained next with reference to FIG. 7.

In this embodiment, when a signal indicating that a card is unreadable is generated from the signal processing unit 7, a stamp 94 is operated to give a word "unreadable" on the card. Other construction is substantially the same as shown in FIG. 2.

In the both embodiments, the card may be carried until all of its information have been read in, by controlling the motor. Further, the card may be rejected after a predetermined number of read-in operations has been counted.

The alarm may be a lamp, a photo-diode, a buzzer or other device which gives the notice to a person working with cards.

What is claimed is:

1. A method to read-in bar-coded information provided on a surface of an object in bar codes having a plurality of bar symbols of at least two kinds of bar width comprising the steps of:

placing said object to read-in said bar-coded information,
   sensing said bar-coded information along a line on the surface of said object,
   converting said bar-coded information to a group of electrical signals,
   storing said group of electrical signals,
   comparing said group of electrical signals with a previously stored group of electrical signals to discriminate a coincidence between said two groups of electrical signals,
   counting to accumulate said coincidence,
   sensing said bar-coded information along a line which is different from the previous line on the surface of said object,
   repeating the same steps of converting, storing, comparing, counting and sensing as above until said object has been carried out of all lines along which said sensing is made, and,
   providing a discrimination signal when the number of coincidence times does not reach a predetermined value.

2. A method to read-in bar-coded information as claimed in claim 1 further comprising the step of:
   rejecting said object to further proceed when said discrimination signal is provided.

3. A method to read-in bar-coded information as claimed in claim 1 wherein
   said steps of comparing, and counting comprises:
   classifying said group of electrical signals into two classified lumps with regard to similarity of the bar-coded information,
   comparing each group of electrical signals with each of the previously stored group in each lump to discriminate the coincidence in each lump,
   counting to accumulate said coincidence times of each lump, and
   storing the group of electrical signals of one lump which is larger in number of coincidence times than the other, and wherein
   said step of providing discrimination signal comprises the step of:
   providing a signal as unreadable when the no group of electrical signals of the both lumps is stored.

4. A method to read-in bar-coded information as claimed in claim 3 further comprising the step of:
   rejecting said object to further proceed when said signal as unreadable is provided.

5. A method to read-in bar-coded information as claimed in claim 3 wherein, in said last step of storing, the group of electrical signals of one lump which is larger by a predetermined value in number of coincidence times than the other is stored.

6. A method to read-in bar-coded information as claimed in claim 3 wherein, in said last step of storing, the group of electrical signals of one lump which is larger by a first predetermined value in number of coincidence times than the other and larger than a second predetermined value is stored.

7. A method to read-in bar-coded information as claimed in claim 6 further comprising the step of:
   rejecting said object to further proceed when said signal as unreadable is provided.

8. A method to read-in bar-coded information as claimed in claim 3 wherein, in said step of storing, the group of electrical signals of one lump which is larger in number of coincidence times than the other and larger than a predetermined value is stored.

9. A method to read-in bar-coded information as claimed in claim 8 further comprising the step of:
   rejecting said object to further proceed when said signal as unreadable is provided.

10. An apparatus to read in bar-coded information provided on a surface of an object in bar codes having a plurality of bar symbols of at least two kinds of bar width comprising:
    means for repeatedly sensing said bar-coded information to produce a plurality of groups of signals indicative of said bar-coded information, and
    means for transferring said object with respect to said sensing means to gradually position said bar-coded information to be sensed and then to be reserved, wherein the improvement comprises:

means, connected to said sensing means, for repeatedly comparing one of said groups with another to count number of coincidence times until said signals indicative of said bar-coded information is interrupted, means, connected to said comparing means, for providing a discrimination signals when the number of coincidences does not reach a predetermined value after said signals indicative of said bar-coded information has been interrupted.

11. An apparatus to read-in bar-coded information as claimed in claim 10 wherein said transferring means includes a motor to carry the object with respect to said sensing means, and wherein the improvement further comprises:

means, connected to said motor, for reversing said motor to reject said object to further proceed.

* * * * *